United States Patent
Ramsay

(10) Patent No.: US 9,663,307 B2
(45) Date of Patent: May 30, 2017

(54) PROCESS FOR OPERATING HOT PARTICLE ROTARY VALVES

(71) Applicant: INEOS EUROPE AG, Vaud (CH)

(72) Inventor: Kevin Peter Ramsay, West Lothian (GB)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/409,037

(22) PCT Filed: Jul. 9, 2013

(86) PCT No.: PCT/EP2013/064433
§ 371 (c)(1),
(2) Date: Dec. 18, 2014

(87) PCT Pub. No.: WO2014/009336
PCT Pub. Date: Jan. 16, 2014

(65) Prior Publication Data
US 2015/0147123 A1 May 28, 2015

(30) Foreign Application Priority Data
Jul. 12, 2012 (EP) .................................. 12176199

(51) Int. Cl.
B65G 53/00 (2006.01)
B65G 53/46 (2006.01)
B01J 8/00 (2006.01)
G01F 11/24 (2006.01)
F16K 49/00 (2006.01)
F16K 5/04 (2006.01)

(52) U.S. Cl.
CPC ........ *B65G 53/4633* (2013.01); *B01J 8/0045* (2013.01); *F16K 5/0407* (2013.01); *F16K 49/00* (2013.01); *G01F 11/24* (2013.01); *B01J 2208/00752* (2013.01); *B01J 2219/00247* (2013.01)

(58) Field of Classification Search
CPC . B65G 29/02; B65G 53/4633; B65G 53/4641
USPC .... 406/128, 197, 62, 63, 64, 65, 66, 67, 68; 198/642, 617
See application file for complete search history.

(56) References Cited

U.S. PATENT DOCUMENTS

| | | | |
|---|---|---|---|
| 1,524,270 A | | 1/1925 | Miller et al. |
| 3,574,411 A | * | 4/1971 | Miller ................ B65G 53/4633 222/365 |
| 3,980,208 A | * | 9/1976 | Hehl ....................... B29C 45/18 406/136 |
| 4,180,188 A | * | 12/1979 | Aonuma ............ B65G 53/4633 222/368 |
| 4,229,250 A | * | 10/1980 | Lehtinen .................. D21B 1/12 162/183 |

(Continued)

FOREIGN PATENT DOCUMENTS

CN 202080733 U 12/2011
WO WO 2009/024872 A2 2/2009

*Primary Examiner* — Joseph Dillon, Jr.
(74) *Attorney, Agent, or Firm* — Nixon & Vanderhye P.C.

(57) ABSTRACT

Process for operating a hot particle rotary valve having a rotor and a casing. The process includes subjecting the hot particle rotary valve to an internal temperature increase treatment in which the inside of the rotary valve is heated during the start-up of the particle rotary valve.

19 Claims, 3 Drawing Sheets

(56) References Cited

U.S. PATENT DOCUMENTS

| | | | | |
|---|---|---|---|---|
| 4,427,136 A * | 1/1984 | MacKay | G01F 11/24 | 222/368 |
| 4,676,742 A * | 6/1987 | Kozierok | C22B 1/005 | 266/901 |
| 4,790,910 A * | 12/1988 | Havlik | C10B 53/06 | 196/112 |
| 5,236,285 A * | 8/1993 | Prough | 406/52 | |
| 5,236,286 A * | 8/1993 | Prough | 406/52 | |
| 5,301,439 A * | 4/1994 | Wang | F26B 21/083 | 34/330 |
| 5,375,564 A * | 12/1994 | Gail | F01B 13/068 | 123/44 C |
| 5,482,027 A * | 1/1996 | Stiller | F23K 1/04 | 110/106 |
| 5,765,728 A | 6/1998 | Simpson et al. | | |
| 5,997,220 A * | 12/1999 | Wormser | B65G 53/4616 | 222/367 |
| 6,164,220 A * | 12/2000 | Magnusson | F23G 7/105 | 110/224 |
| 6,616,384 B2 * | 9/2003 | Prough | 406/63 | |
| 6,641,336 B1 * | 11/2003 | Bolles | 406/63 | |
| 2003/0231933 A1 * | 12/2003 | Prough | 406/63 | |
| 2006/0045729 A1 * | 3/2006 | Heep | B65G 53/4633 | 415/8 |
| 2009/0292101 A1 * | 11/2009 | Fellinger | B29B 13/021 | 528/272 |
| 2013/0174765 A1 * | 7/2013 | Astesiano | F23C 6/02 | 110/341 |
| 2014/0363585 A1 * | 12/2014 | Pialot | B29C 67/0085 | 427/551 |
| 2016/0152473 A1 * | 6/2016 | Hou | C01B 25/18 | 252/182.12 |
| 2016/0195338 A1 * | 7/2016 | Uchida | F23L 7/007 | 165/7 |

* cited by examiner

PROCESS FOR OPERATING HOT PARTICLE ROTARY VALVES

This application is the U.S. national phase of International Application No. PCT/EP2013/064433 filed Jul. 9, 2013 which designated the U.S. and claims priority to European Patent Application No. 12176199.3 filed Jul. 12, 2012, the entire contents of each of which are hereby incorporated by reference.

The present invention relates to a process for operating hot particle rotary valves. In particular, the present invention relates to a process for operating hot particle rotary valves during start-up.

BACKGROUND OF THE INVENTION

The use of rotary valves is well known in the industry. For example, the document "A Practical Guide to Rotary Valves" (April 2008—Ian Blackmore—Rota Val Ltd and Professor Mike Bradley—The Wolfson Centre, University of Greenwich—http://www.shapa.co.uk/pdf/rotary_valves-.pdf) gives extensive details of rotary valves. In particular, rotary valves are used for conveying hot particle during the operations downstream of olefin polymerisation reactors, for example between the polymerisation section and the extrusion section.

U.S. Pat. No. 5,765,728 discloses a system which conveys chopped PET (chips/flakes) at ambient temperature from a supply duct to a methanolysis recovery reactor. The system includes a rotary vane valve which is operated under conditions preventing the condensation of vapors of process chemicals coming from the methanolysis reactor.

U.S. Pat. No. 1,524,270 discloses a system comprising a sealing spider (rotating at a constant rate) for conveying coal to a furnace wherein the quantity of coal fed is controlled (by using an upstream dam or breaker) in order to maintain a continuous flow of coal throughout the system.

BRIEF DESCRIPTION OF THE DRAWINGS

FIG. 2 is a typical representation of a rotary valve's rotor and

FIG. 3 is a see-through representation of a rotary valve comprising both the rotor blades and the casing. The volume between two consecutive blades is usually named a pocket or a rotor chamber.

Figure 1:
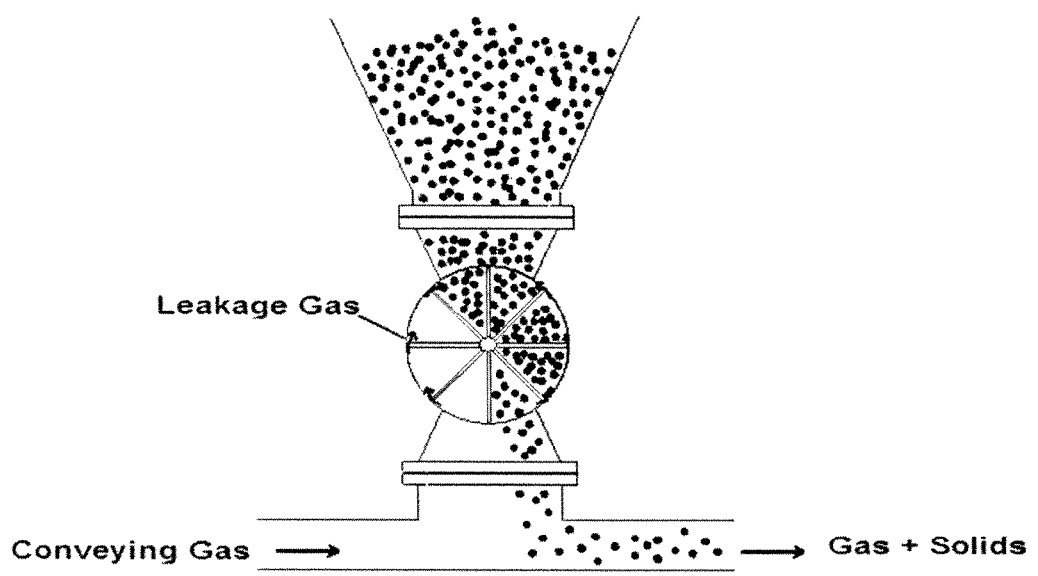
FIG. 1 is a typical representation of such rotary valve when used for the conveying of olefin polymer powder. The rotary valve comprises a rotor with blades and a casing.
Figure 2:
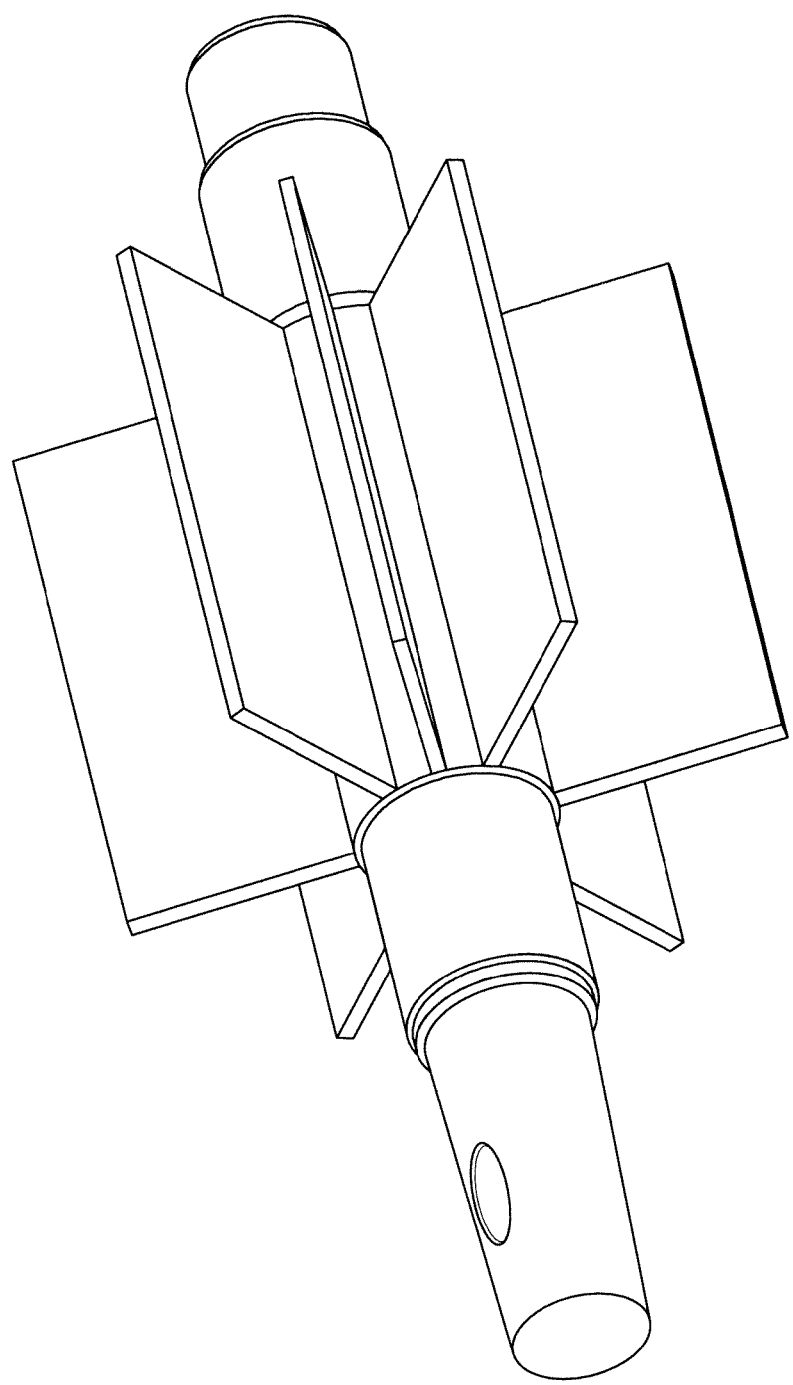
FIGS. 2 and 3 have been extracted from "A Practical Guide to Rotary Valves" (April 2008—Ian Blackmore—Rota Val Ltd and Professor Mike Bradley—The Wolfson Centre, University of Greenwich—http://www.shapa.co.uk/pdf/rotary_valves.pdf).
Figure 3:
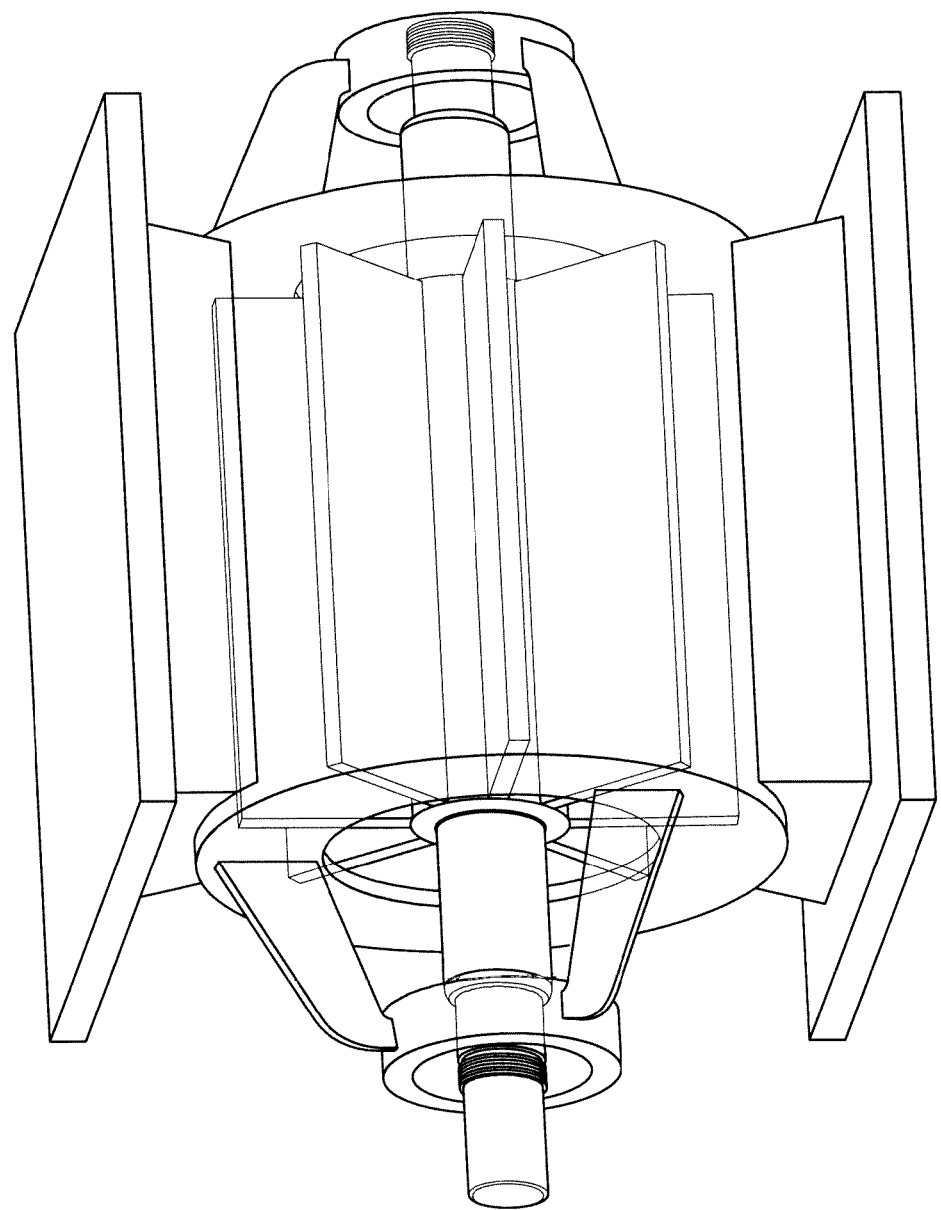

One of the recurrent problems encountered during the use of the rotary valves relates to gas leakages occurring between the rotor blades and the casing; the space between the rotor blades and the casing will be referred hereinafter as the clearance. Said clearance and the consequent gas leakages are depicted in FIG. 1 for illustrative purpose.

In order to reduce the gas leakages, the clearance between the rotor and the casing has to be as small as possible. However, too small a clearance can cause problems at start-up due to the rapid thermal expansion of the rotor relative to the casing when initially contacted with hot powder. The thermal expansion of the rotor relative to the casing causes the rotor tips to make contact with the casing, resulting in subsequent damage to the rotary valve.

Several solutions have been proposed and tried, e.g. external heat tracing and/or lagging of the equipment. Unfortunately, said expensive solutions have proven not to be satisfactory, especially for large rotary valves. Consequently, these rotary valves used for high capacity conveying of hot powder require a sufficient clearance which brings back the above mentioned problem of gas leakages.

DESCRIPTION OF THE INVENTION

There is thus a need in the art for a technology which allows the conveying of large quantities of hot particle through rotary valves which solves all the above problems simultaneously.

The Applicants have found a method to avoid these problems which consists in the way the rotary valve is operated.

The present invention relates to a process for operating a hot particle rotary valve comprising a rotor and a casing characterised in that the hot particle rotary valve is subjected to a slow internal temperature increase treatment during the start-up period of the said hot particle rotary valve.

Whilst not wishing to be bound to this theory, the Applicants believe that, in the absence of their claimed internal temperature treatment, when the hot particle is introduced into the rotary valve, the said hot particle first heats the rotor and casing at significantly different rates which in turn creates a temperature difference between the rotor and the casing; such temperature difference leads to a faster expansion of the rotor than the casing, thereby reducing the clearance to zero and leading to valve wear metal contamination in the particle or major damage to the valve requiring plant shutdown for repair or replacement of the valve. The present invention allows to slowly control the temperature increase of the rotor and casing. Such smooth temperature increase of both the rotor and the casing induces a simultaneous expansion of both parts; which makes now possible to work with low clearance large rotary valves and hot particle without the above mentioned damages.

In particular, the present invention relates to a start-up process for operating a particle rotary valve comprising a rotor and a casing characterised in that the particle rotary valve is subjected to an internal temperature increase treatment.

The internal temperature increase treatment of the particle rotary valve according to the present invention can be performed in any appropriate way known by the man skilled in the art as long as the said temperature increase is performed from the inside of the rotary valve as exemplified hereafter.

According to an embodiment of the present invention, the internal temperature increase treatment is performed by circulating a hot gas to heat the rotary valve rotor and casing. For example, this is done by starting the rotary valve without any hot particle being present, and circulating hot gas—from the particle conveying system and/or elsewhere—to gradually heat the rotary valve rotor and casing. The temperature of the said hot gas is preferably slowly increased to prevent rapid thermal expansion of the rotor and/or casing. This allows to control slowly and smoothly the temperature increase of both the rotor and the casing; the progressive and uniform temperature increase of both the rotor and the casing of the said rotary valve until it reaches (or is near to) its normal operating window allows to subsequently operate the said rotary valve at its nominal throughput of hot particle without facing the prior art problems.

According to an alternative embodiment of the present invention, the internal temperature increase treatment is performed by controlling the initial flow rate of hot particle processed through the said rotary valve, preferably until it reaches its nominal throughput. The control of flow rate of the said hot particle allows to control slowly and smoothly the temperature increase of both the rotor and the casing; the progressive and uniform temperature increase of both the rotor and the casing of the said rotary valve until it reaches its normal operating window allows to subsequently operate the said rotary valve at its nominal throughput of hot particle without facing the prior art problems.

According to an embodiment of the present invention, the internal temperature increase treatment is performed by circulating a hot gas to heat the rotary valve rotor and casing and by controlling the initial flow rate of hot particle processed through the said rotary valve, preferably until it reaches its nominal throughput.

According to an embodiment of the present invention, the internal temperature increase treatment is performed by first circulating a hot gas to heat the rotary valve rotor and casing followed by controlling the initial flow rate of hot particle processed through the said rotary valve, preferably until it reaches its nominal throughput.

According to an embodiment of the present invention, the duration of the internal temperature increase treatment lasts at least one hour; it may also last at least six hours, or even at least twelve hours. According to another embodiment of the present invention, the duration of the internal temperature increase treatment lasts at most forty eight hours, preferably at most twenty four hours.

The initial flow rate of hot particle processed through the said rotary valve can be controlled by any appropriate method. For example, for variable speed rotary valves, it can advantageously be controlled by controlling the rotating speed of the rotary valve and/or by controlling the feed rate of hot particle entering the valve; for fixed speed valves, it can advantageously be controlled by controlling the feed rate of hot particle entering the valve. Said feed rate control of hot particle entering the valve can be done by any appropriate method; e.g. by varying the discharge rate of any upstream process equipment. For example, for a rotary valve having a nominal throughput of hot particle of X m3/hr, the initial feed rate of hot particle entering the valve is less than 0.8 X, preferably lower than 0.5 X, for example less than 0.2 X during at least one hour, preferably at least 2 hours, for example at least 3 hours. For example, for a rotary valve having a nominal throughput of hot particle of X m3/hr, the initial flow rate of the rotary valve is less than 0.8 X, preferably lower than 0.5 X, for example less than 0.2 X during at least one hour, preferably at least 2 hours, for example at least 3 hours.

DETAILED DESCRIPTION OF EMBODIMENTS OF THE INVENTION

According to an embodiment of the present invention, the internal temperature increase treatment is such that the maximum temperature increase rate is below 30° C. per hour, for example below 20° C. per hour, or even below 10° C. per hour.

The present invention will now be illustrated by several embodiments.

Thus, the present invention applies to hot particle rotary valves. Such rotary valves are sometimes referred to as airlock or rotary feeder.

The present invention is particularly applicable to large rotary valves; it could equally apply to small rotary valves but the corresponding benefits would be barely noticeable since the above expansions delta between the rotor and the casing would be so little that they would not have the same impact as the one encountered with large rotary valves.

Thus, such rotary valves have preferably a capacity higher that 20 tons of particle per hour, preferably higher than 30 tons per hour, e.g. at least 40 tons per hour or even at least 50 tons per hour.

In order to fully benefit from the advantages provided by the present invention, the temperature of the hot particle (preferably a powder) processed through the rotary valve according to the present invention is preferably of at least 30° C. above the ambient temperature of the valve; said hot particle (preferably a powder) temperature can be higher than 60° C., higher than 75° C., or even higher than 90° C.

The processing of polymer particle—e.g. polyethylene powder—exhibiting a temperature above 100° C. and even above 110° C. is now possible with tight clearance rotary valves thanks to the start-up operating procedures according to the present invention.

In an embodiment according to the present invention, the D50 of the polymer particle (e.g. powder) is lower than 2000, preferably comprised between 200 and 1800, more preferably comprised between 500 and 900 microns. For the purpose of the present invention and appending claims, the D50 is the median particle size of the polymer particle/powder. Any conventional means for example a Malvern or a mesh sieving technique can be used to measure the median particle size of the polymer particle/powder. For the purposes of the present invention and appended claims, the measurement of the median particle size (D50) was made according to the International Standard ISO 13320:2009 ("Particle size analysis—Laser diffraction methods"). For example, Malvern Instruments' laser diffraction systems can advantageously be used, e.g. a Malvern Mastersizer S or a Malvern Mastersizer 2000; such instrument together with its operating manual meets or even exceeds the requirements set-out within the ISO 13320 Standard.

When a Malvern Mastersizer S is used for measuring the particle/powder D50, the Malvern spray procedure is preferably selected.

When pellets are used in the rotary valve of the present invention, preferably polymer pellets, the temperature of the pellets is preferably in the range of 40° C. to 80° C., e.g 50 to 70° C.

In addition to the control according to the present invention, the rotary valve can also be advantageously insulated; however, another advantage of the present invention is that the claimed control potentially allows building and using rotary valves without such external insulation feature.

In addition to the control according to the present invention, the rotary valve can also be advantageously externally heated; however, another advantage of the present invention is that the claimed control potentially allows building and using rotary valves without such external heating feature.

Different methods have been applied in order to reduce the leakage, e.g. tighter clearances.

As explained hereinbefore, the present invention now allows to use rotary valves exhibiting such tighter clearances even when hot powders/pellets are processed which is clearly an important benefit of the present invention. Thus, and this is a preferred embodiment according to the present invention, such tighter clearance rotary valves are usually characterised by a value (measured at 20° C.) inferior to 0.45 mm, inferior to 0.35 mm, inferior to 0.25 mm, or even inferior to 0.16 mm.

The rotary valve according to the present invention preferably comprises at least 6 pockets (or rotor chambers), e.g. between 8 and 14 pockets. In a preferred embodiment according to the present invention, the hot particles which are conveyed through the rotary valve occupy between fifty percent and one hundred percent of the volume of the pocket, preferably between sixty percent and one hundred percent, more preferably between seventy percent and one hundred percent of the said volume. In an additional embodiment of the present invention, during normal operating conditions (nominal throughput—i.e. after start-up for the variable speed rotary valves, and at any operating time for the fixed speed rotary valves), the rotor tip speed (also known as the circumferential speed) is preferably comprised between 0.5 and 1.2 m/sec, more preferably between 0.6 and 1 m/sec.

The rotary valves according to the present invention are mainly used as feeding device in pneumatic dilute phase conveying systems with a differential pressure up to several bars; they are also used for the discharge (and/or dosing) of particles (e.g. powders/pellets) from silos.

The present invention is applicable to any rotor size. For example, rotor having a diameter equal or higher than 200 mm, 250 mm, 300 mm, 400 mm, 500 mm or even 600 mm can advantageously be used in the present invention.

For conveying the hot particle according to the present invention, the rotor is preferably made of stainless steel and the housing is either stainless steel or hard-coated aluminium. These materials are preferably used when the hot particle is polyethylene or polypropylene.

This invention is particularly important in the start-up of high capacity plants having large diameter rotary valves with tight clearances. It is thus most advantageously applied in systems with rotors having a diameter equal or higher than 400 mm, 500 mm or even 600 mm whilst also having clearances (measured at 20° C.) inferior to 0.35 mm, inferior to 0.25 mm, or even inferior to 0.16 mm. It is especially important to optimise the start-up rate of high capacity plants from the start of polymer particle withdrawal from the reactor. This discovery enables the rotary valve system (rotor and casing) to have been pre-heated (for example with hot gas), ideally to within 20° C., preferably within 10° C. of the operating temperature of the hot polymer powder at the rotary valve in question, prior to polymer powder withdrawal from the reactor. The rate of change in temperature of the rotary valve system following introduction of hot polymer to the valve can thus be maintained at less than 30° C. per hour, for example below 20° C. per hour, or even below 10° C. per hour even whilst increasing the polymer powder flowrate through the valve to its steady state nominal throughput rate in less than one or two hours.

The invention claimed is:

1. Process for operating a hot particle rotary valve comprising a rotor and a casing, said process comprising the step of subjecting the hot particle rotary valve to an internal temperature increase treatment in which the inside of the rotary valve is heated during the start-up of the said particle rotary valve, and wherein the internal temperature increase treatment is performed by processing hot particle through the said rotary valve and controlling the initial flow rate of said hot particle processed through the said rotary valve.

2. Start-up process for operating a hot particle rotary valve comprising a rotor and a casing, said process comprising the step of subjecting the hot particle rotary valve to an internal temperature increase treatment in which the inside of the rotary valve is heated, and wherein the internal temperature increase treatment is performed by processing hot particle through the said rotary valve and controlling the initial flow rate of said hot particle processed through the said rotary valve.

3. Process according to claim 1 wherein the internal temperature increase treatment is performed by circulating a hot gas to heat the rotary valve rotor and casing.

4. Process according to claim 2 wherein the internal temperature increase treatment is performed by circulating a hot gas to heat the rotary valve rotor and casing.

5. Process according to claim 1 wherein the rotary valve is heated to within 30° C. of the temperature of the hot particle prior to introduction of hot particle to the rotary valve.

6. Process according to claim 2 wherein the rotary valve is heated to within 30° C. of the temperature of the hot particle prior to introduction of hot particle to the rotary valve.

7. Process according claim 1 wherein the internal temperature increase treatment is performed by first circulating a hot gas and subsequently by processing hot particle through said rotary valve and controlling the initial flow rate of hot particle processed through the said rotary valve to control the rate of increase in temperature of the rotary valve rotor and casing.

8. Process according claim 2 wherein the internal temperature increase treatment is performed by first circulating a hot gas and subsequently by processing hot particle through said rotary valve and controlling the initial flow rate of hot particle processed through the said rotary valve to control the rate of increase in temperature of the rotary valve rotor and casing.

9. Process according to claim 1 wherein the internal temperature increase treatment is performed by maintaining the maximum temperature increase rate below 30° C. per hour.

10. Process according to claim 1 wherein the internal temperature increase treatment lasts at least one hour.

11. Process according to claim 1 wherein the rotary valve has a capacity of at least twenty tons of particle per hour.

12. Process according to claim 1 wherein the temperature of the hot particle processed through the rotary valve is higher than 60° C.

13. Process according to claim 2 wherein the temperature of the hot particle processed through the rotary valve is higher than 60° C.

14. Process according to claim 1 wherein the particle is a polymer powder or pellet.

15. Process according to claim 2 wherein the particle is a polymer powder or pellet.

16. Process according to claim 1 wherein the initial flow rate of particle to the rotary valve is less than 0.5 times the final steady state flow rate to the rotary valve during at least one hour.

17. Process according to claim 2 wherein the initial flow rate of particle to the rotary valve is less than 0.5 times the final steady state flow rate to the rotary valve during at least one hour.

18. Process according to claim 1 wherein the particle rotary valve comprises a stainless steel rotor and a casing having a clearance (at 20° C.) of less than 0.35 mm.

19. Process according to claim 1 wherein the particle rotary valve comprises pockets and wherein the hot particles which are conveyed through the rotary valve occupy between fifty percent and one hundred percent of the volume of the pockets.

* * * * *